(12) United States Patent
Skowronek et al.

(10) Patent No.: US 7,950,585 B2
(45) Date of Patent: May 31, 2011

(54) PROTECTED CONTACTLESS CARD

(75) Inventors: Dan Skowronek, Parker, CO (US); Christopher T. Cocks, Denver, CO (US)

(73) Assignee: First Data Corporation, Greenwood Village, CO (US)

( * ) Notice: Subject to any disclaimer, the term of this patent is extended or adjusted under 35 U.S.C. 154(b) by 1038 days.

(21) Appl. No.: 11/741,255

(22) Filed: Apr. 27, 2007

(65) Prior Publication Data

US 2008/0265039 A1 Oct. 30, 2008

(51) Int. Cl.
*G06K 19/06* (2006.01)

(52) U.S. Cl. ........................ 235/492; 235/493

(58) Field of Classification Search ............. 235/492, 235/493; 340/572.3, 572.7, 815.4
See application file for complete search history.

(56) References Cited

U.S. PATENT DOCUMENTS

| | | |
|---|---|---|
| 5,151,684 A | 9/1992 | Johnsen |
| 5,218,343 A | 6/1993 | Stobbe et al. |
| 5,971,587 A | 10/1999 | Kato et al. |
| 6,121,544 A | 9/2000 | Petsinger |
| 6,257,486 B1 | 7/2001 | Teicher et al. |
| 6,275,745 B1 | 8/2001 | Critelli et al. |
| 6,557,758 B1 | 5/2003 | Monico |
| 6,863,219 B1 * | 3/2005 | Jacobsen et al. .............. 235/492 |
| 2005/0099292 A1 | 5/2005 | Sajkowsky |
| 2006/0017570 A1 | 1/2006 | Moskowitz et al. |
| 2006/0028319 A1 | 2/2006 | Kean et al. |
| 2006/0187055 A1* | 8/2006 | Colby ........................ 340/572.7 |
| 2006/0290501 A1 | 12/2006 | Hammad et al. |

OTHER PUBLICATIONS

PCT International Search Report and Written Opinion mailed Aug. 21, 2008, International U.S. Appl. No. PCT/US2008/061589, 13 pages.

* cited by examiner

*Primary Examiner* — Thien M Le
(74) *Attorney, Agent, or Firm* — Kilpatrick Townsend & Stockton LLP

(57) ABSTRACT

A protected contactless presentation instrument is disclosed. In one embodiment, the protected contactless presentation instrument includes an RFID chip that can be manually exposed and shielded by a user. The protected contactless presentation instrument may include a moveable tab that includes the RFID chip. The protected contactless presentation instrument may also include a moveable shield. Another embodiment of the invention provides for a contactless presentation instrument that includes an electroluminescence material.

28 Claims, 8 Drawing Sheets

PROTECTED CONTACTLESS CARD

BACKGROUND OF THE INVENTION

This disclosure relates in general to contactless cards and, but not by way of limitation, to physical protection schemes for contactless cards and/or Smartcards amongst other things.

Protected contactless cards are perceived by some to have security vulnerabilities. Users may be concerned that someone may surreptitiously steal credit card information with a surveillance device. Users may also be concerned that they may inadvertently pay for another person's transaction by standing too close to a contactless card terminal reader. While these fears and others may be addressed by contactless card manufacturers and system administrators through other means, consumer perceptions of insecurity are a real issue. Accordingly, there is a need for security improvements that can be made to contactless cards that assuage the fears of consumers.

BRIEF SUMMARY OF THE INVENTION

In one embodiment, the present disclosure provides for a contactless device that includes a presentation instrument body, a shield coupled to the presentation instrument body, a tab moveably coupled with the presentation instrument body between at least a first position and a second position, and a radio frequency identification (RFID) chip coupled to the tab. The RFID chip may be at least partially exposed when the tab is at the first position. The RFID chip is at least partially covered by the shield when the tab is at the second position.

Embodiments of the invention also provide for a slideable and rotatable tab. The tab may also include grip edges. The device may also include a spring coupled to the tab and the presentation instrument body that biases the tab in the second position. The presentation instrument body may include a magnetic stripe. The shield may include a material such as a metal mesh, a metal foil and/or a material coated with a metallic ink. The device may also include an electroluminescence material coupled with the presentation instrument body and electrically coupled with the RFID chip. The electroluminescence material emits light when the RFID chip has been read by an RFID terminal reader. The tab may be circular.

Another embodiment of the invention provides for a contactless device that includes a presentation instrument body, an RFID chip coupled with the presentation instrument body, and a moveable shield coupled with the presentation instrument body. The shield is moveable between at least a first position and a second position. The RFID chip is at least partially exposed when the moveable shield is at the first position. The RFID chip is at least partially covered by the moveable shield when the moveable shield is at the second position.

Another embodiment of the invention includes a contactless device that includes a presentation instrument body, an RFID chip with an RFID inductor coupled with the presentation instrument body, and an electroluminescence material coupled with the presentation instrument body. The electroluminescence material emits light when the RFID chip communicates with an RFID terminal reader. The electroluminescence material is excited by the RFID chip when the chip has been read by an RFID terminal reader. The electroluminescence material may be a phosphor-based material. The electroluminescence material may be electrically coupled with the RFID inductor. The device may include a second RFID inductor coupled electrically with the electroluminescence material.

Another embodiment of the invention provides for a method of personalizing a protected contactless device that comprises an radio-frequency device coupled with a tab that is coupled with the body of a contactless device. The method includes coupling the radio-frequency device into the tab, recording account information on the radio-frequency chip, coupling a shield with the body of the contactless device, printing the body of the contactless device, and coupling the tab with the body of the contactless device. The tab is moveable between at least a first position and a second position. The first position is such that a portion of the tab including the radio-frequency chip is covered by the shield. The second position is such that the portion of the tab including the radio-frequency chip is not covered by the shield.

In another embodiment the personalizing the radio frequency chip may include electromagnetically reading an identifier from the radio-frequency chip with a radio-frequency transceiver while the radio-frequency device is within the tab. Personalizing may also include electromagnetically writing personalization information onto the radio-frequency chip while the radio-frequency device is within the tab. Personalizing may further include recording an association between the personalization information and the identifier on a storage device.

In another embodiment, a contactless device includes a presentation instrument body; an RFID chip coupled with the presentation instrument body, and a shield coupled with the presentation instrument body. At least one of the shield and the RFID is moveable relative each other to at least partially expose the chip.

In the appended figures, similar components and/or features may have the same reference label. Where the reference label is used in the specification, the description is applicable to any one of the similar components having the same reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

In describing embodiments of the invention, reference is sometimes made to terms having specific intended meanings. For example, as used herein, an "RFID chip" is any microprocessor device configured to exchange data electromagnetically. The RFID chip may include a radio frequency inductor, volatile or non-volatile memory storage, a microprocessor, circuitry logic, and/or an antenna. While it is generally anticipated that such electromagnetic data communications will take place at radio frequencies, this is not a requirement and the electromagnetic data exchanges may take place at any frequency.

In one embodiment, the present disclosure provides for a protected contactless card. The protected contactless card includes an RFID chip and a shield. The shield protects the RFID chip from detection by an RFID reader. The shield may be moveable relative to the RFID chip and the card body in order to expose the RFID chip and permit access by an RFID reader. The shield may move laterally or rotate in order to expose the RFID chip.

In another embodiment the present disclosure provides for a protected contactless card with a shield and an RFID chip. In this embodiment, the shield may be fixed and the RFID chip may be moveable relative to the shield and the card body in order to expose the RFID chip and permit access by an RFID reader. The RFID chip may move laterally or rotate in order to expose the RFID chip.

Another embodiment of the invention provides for a protected contactless card that includes an electroluminescence material. The electroluminescence material illuminates when the RFID chip on the protected contactless card communicates with an RFID terminal. The electroluminescence material may be electrically coupled with the RF inductor within the RFID chip such that when the RF inductor is activated by an RFID reader the RF inductor powers the electroluminescence material. The card may include a second RF inductor that is used to power the electroluminescence material.

Figure 1A:
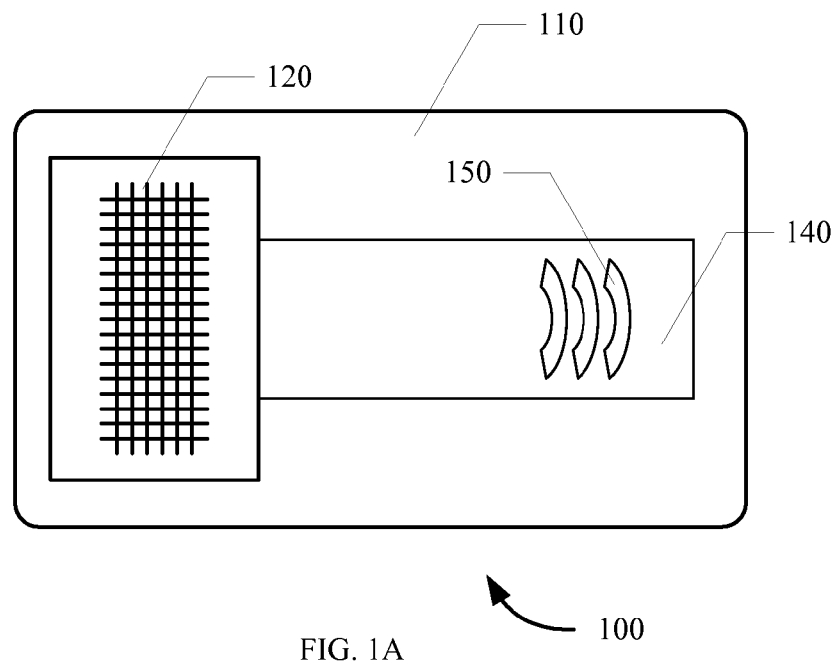
FIGS. 1A and 1B show a protected contactless card with a slideable tab 140 according to one embodiment of the invention.

Referring first to FIG. 1A, a protected contactless presentation instrument 100-A is shown. The protected contactless presentation instrument 100-A may be a credit card, debit card, charge card, access card, stored value card, transportation card, or the like. The protected contactless presentation instrument 100-A includes a card body 110 and a shield 120. The card body 110 may be constructed of plastic, cardstock, etc. The shield 120 includes a wire mesh of conductors. The shield may be applied to both sides of the contactless presentation instrument 100-A. The protected contactless presentation instrument may 100-A also include a moveable tab 140 with grip ridges 150. A portion of the tab 140 is beneath the shield 120. The portion of the tab 140 beneath the shield 120 includes an RFID chip 130 (see FIG. 1B).

While the shield 120 shown in FIG. 1A includes a wire mesh, other shields may be used. For example, the shield 120 may include a conductor, metal mesh, a metal foil, a metallic ink, etc. Any type of material that creates a Faraday cage that isolates the RFID chip from electromagnetic radiation, such as radio frequency radiation from an RFID terminal reader may be used. The shield 120 may be constructed out of a metallic substance. Moreover, the shield 120 may include a metallic material embedded within other materials. For example, the shield 120 may include a copper wire mesh embedded in a mylar film. Other materials may also be used, such as plastics and polyesters.

Figure 1B:
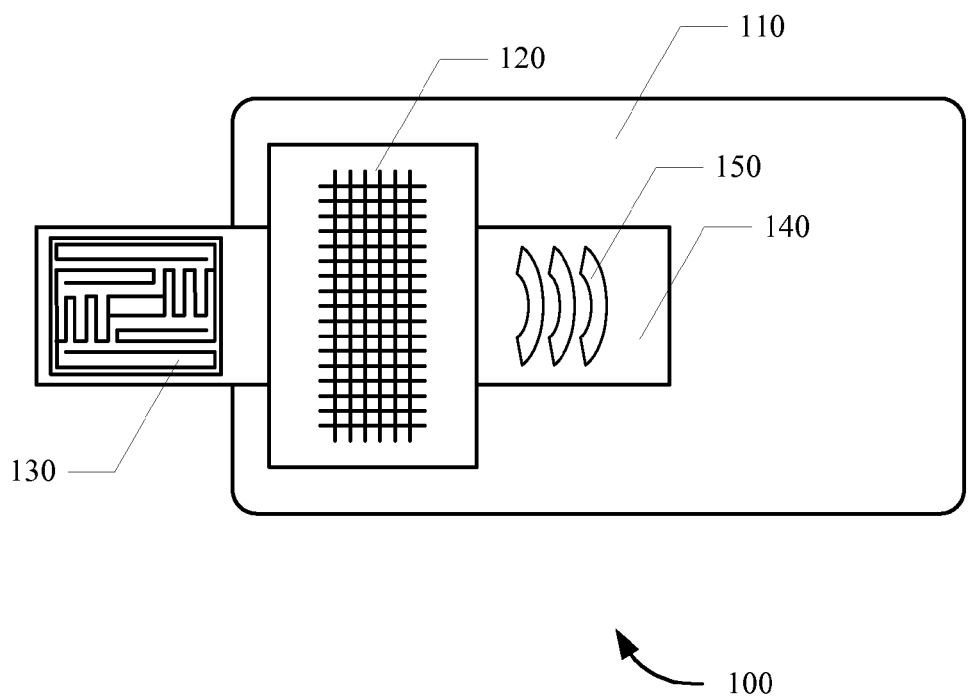

The tab 140 is moveable relative to the card body 110 and the shield 120. The tab 140 also includes grip ridges 150 to allow for easier gripping of the tab 140 when a user is sliding the tab 140. The tab 140 moves between at least two main positions: an open position and a closed position. The tab 140 shown in FIG. 1A is in the closed position. In this position the RFID chip 130 is shielded from radiation by the shield 120. FIG. 1B shows the tab 140 in the open position exposing the RFID chip 130. A user simply slides the tab 140 as shown to expose the RFID chip 130 and complete a transaction. When the tab 140 is in the closed position, the RFID chip 130 is shielded by the shield 120 and will not communicate with an RF reader. The RFID chip 130, may be embedded within the tab 140.

The card body 110 may include guides, groves and/or a slot within which the tab 140 may slide. Guides may also be placed beneath or within the shield 102 for lateral support. The guides, groves, and/or slots may hold the tab 140 from lateral movement as a user slides the tab from position to position.

In another embodiment of the invention, the tab 140 is coupled to the card body 110 with a spring. The spring is arranged such that when the tab 140 is in the open position, the spring exerts a force on the tab 140. In such an arrangement, a user must apply a counter force on the tab 140 in order to hold the tab 140 in the open position. When the user releases the tab 140, the spring pulls the tab 140 into the closed position. With a spring, the tab 140 cannot be opened exposing the RFID chip without user interaction.

Figure 2A:
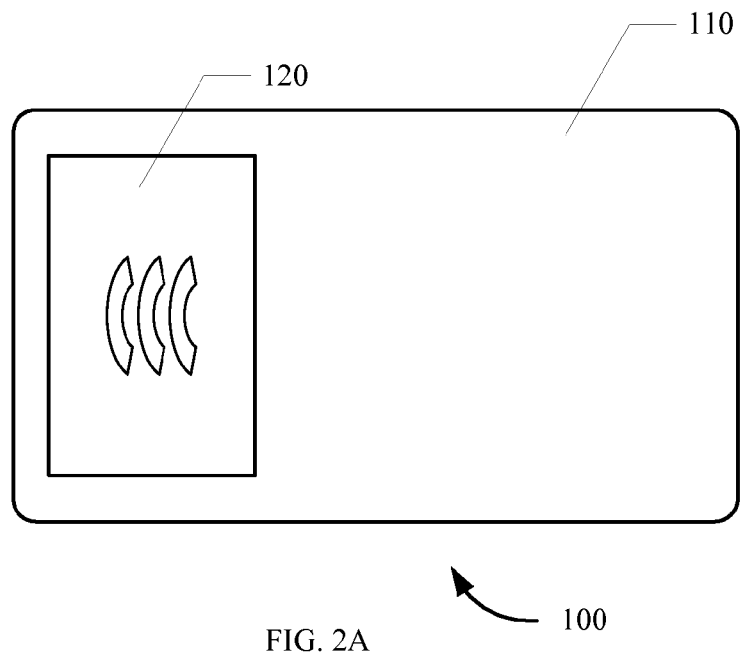
FIGS. 2A and 2B show a protected contactless card with a moveable shield according to one embodiment of the invention.
Figure 2B:
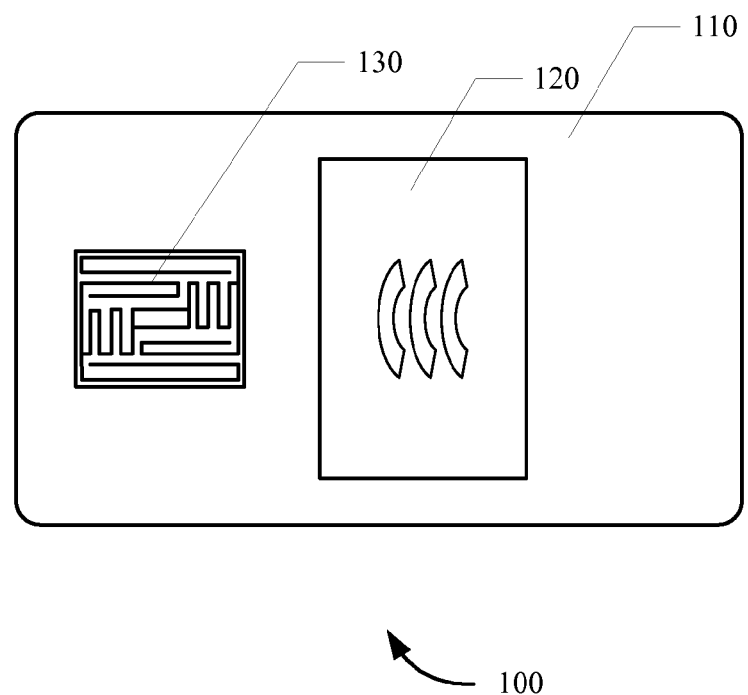

FIG. 2A shows a protected contactless presentation instrument 100-B according to another embodiment of the invention. In this embodiment, the shield 120 is moveable. FIG. 2A shows the shield 120 in the closed position shielding the RFID chip 130. FIG. 2B shows the shield 120 in the open position exposing the RFID chip 130. The shield 120 includes a metallic foil and grip ridges. The shield 120 may be embedded within the card body 110. The card body 110 may include grooves within which the shield 120 moves from position to position. The shield 120 may also include a spring that is coupled to the card body 110 and keeps the shield 120 over the RFID chip 130 when not engaged by a user.

Figure 3A:
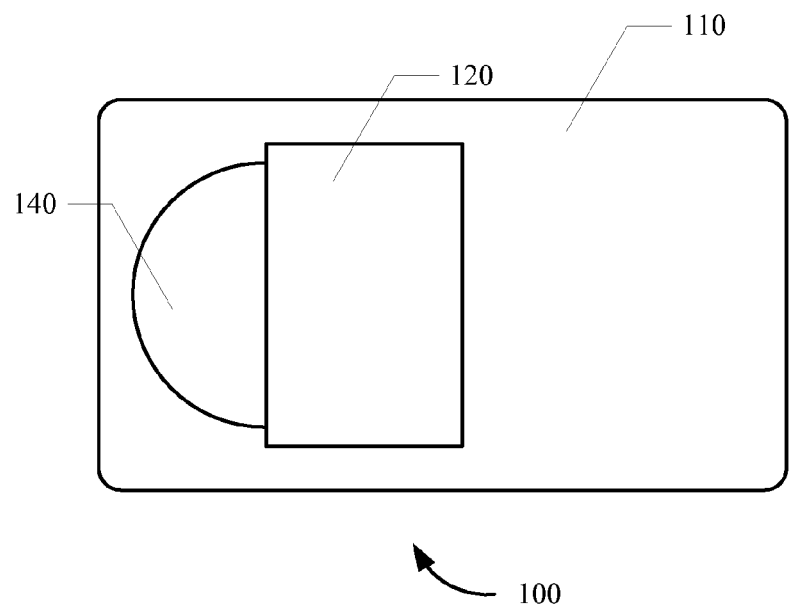
FIGS. 3A and 3B show a protected contactless card with a rotatable tab 140 according to one embodiment of the invention.
Figure 3B:
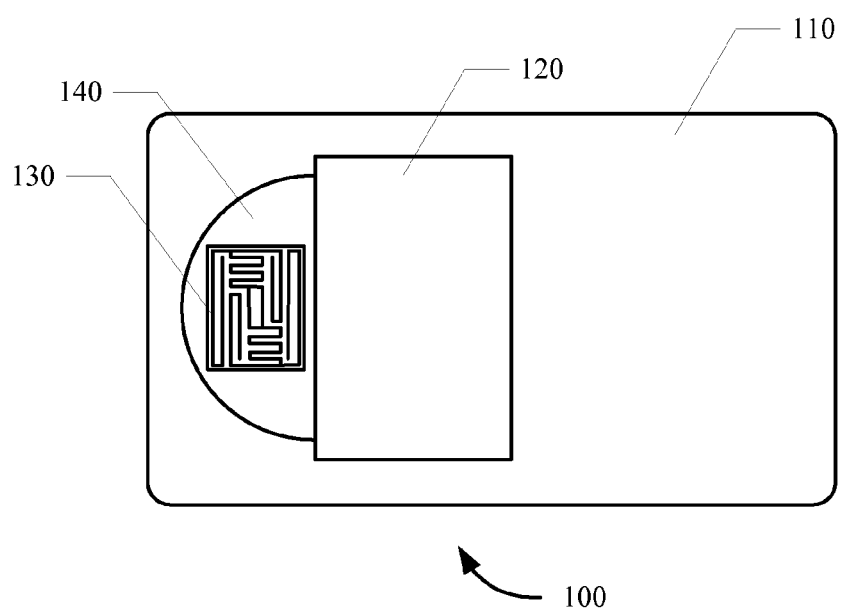

FIG. 3A shows a protected contactless presentation instrument 100-C according to another embodiment of the invention. The tab 140-C, in this embodiment, is circular and includes an RFID chip 130 on one portion of the circular tab 140-C. The circular tab 140-C is positioned on the card body 110 in such away that a portion of the circular tab 140 is covered by a shield 120. The circular tab 140-C may be attached to the card body 110 through the center of the circular tab 140-C so that the circular tab 140-C may rotate. The RFID chip 130 in one position is completely shielded by the shield 120 and may be exposed by rotating the circular tab 140 about one-hundred eighty degrees to expose the RFID chip 130 as shown in FIG. 3B. The circular tab 140-C may include a spring, such as a torsion spring, that applies a force on the circular tab 140-C to keep the RFID chip 130 shielded by the shield 120. A shield may also be placed on the opposite side of the card. The shield on the opposite side of the card may cover the entire area of the card or may be limited to certain areas on the card. The shield on the opposite side may be similar to the shield on the side shown in the figure.

Figure 4A:
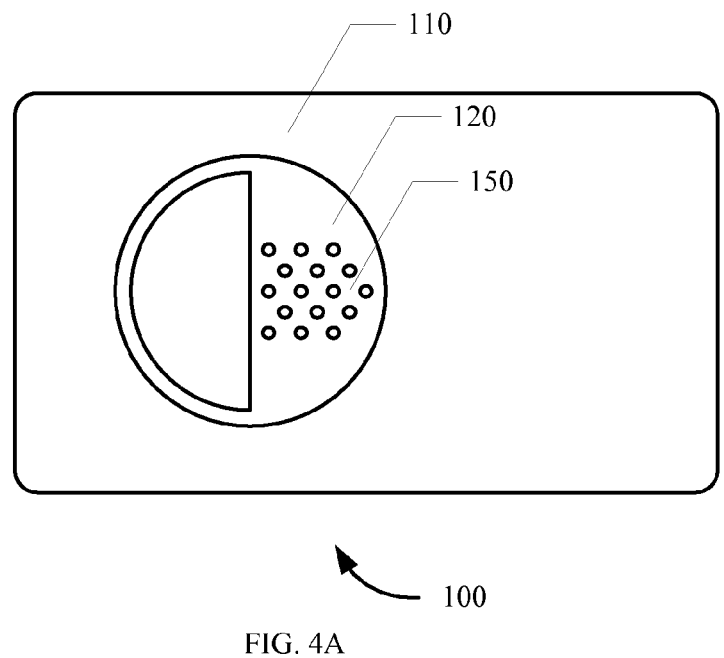
FIGS. 4A and 4B show a protected contactless card with a rotatable shield according to one embodiment of the invention.
Figure 4B:
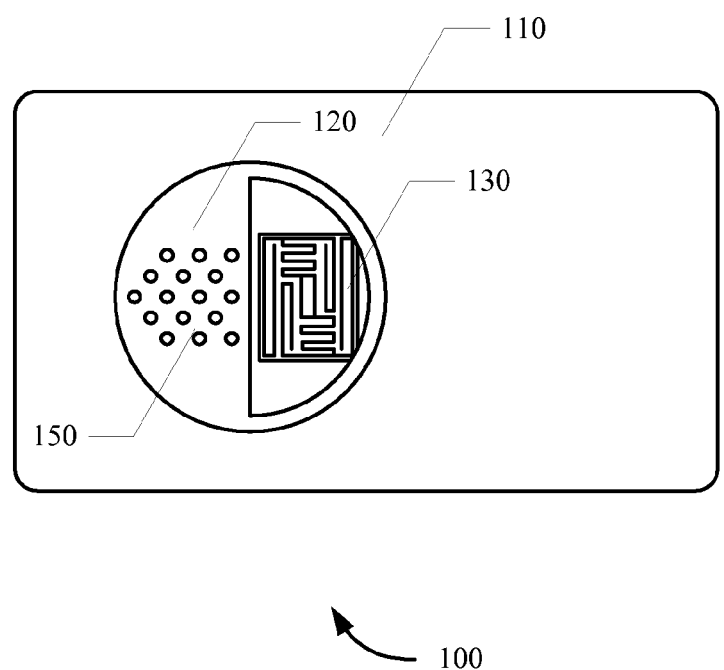

FIG. 4A shows a protected contactless presentation instrument 100-D according to another embodiment of the invention. In this embodiment, the shield 120-D is circular, moveable and includes an aperture. The RFID chip 130 is secured directly to the card body 110. The shield 120-D may be rotated in such a way that the opening is over the RFID chip 130 exposing the RFID chip 130 as shown in FIG. 4B. The shield 120 in this embodiment also includes small bumps 150 to aid a user in rotating the shield 120. The shield 120 may also include a spring to keep the shield 120 in position to shield 120 the RFID chip 130 until intervention by a user.

The protected contactless presentation instruments discussed in embodiments of the invention may also include a tab 140 with one or more friction stubs that keep the tab 140 from freely sliding from position to position according to one embodiment of the invention. The friction stubs may also provide resistance between the tab 140 and the card body 110. In another embodiment the tab 140 may include a stop. The stop is used to limit the position of the tab 140 in the open position and/or the closed position. Moreover, the stop and friction stubs may also be included on a moveable shield.

Figure 5A:
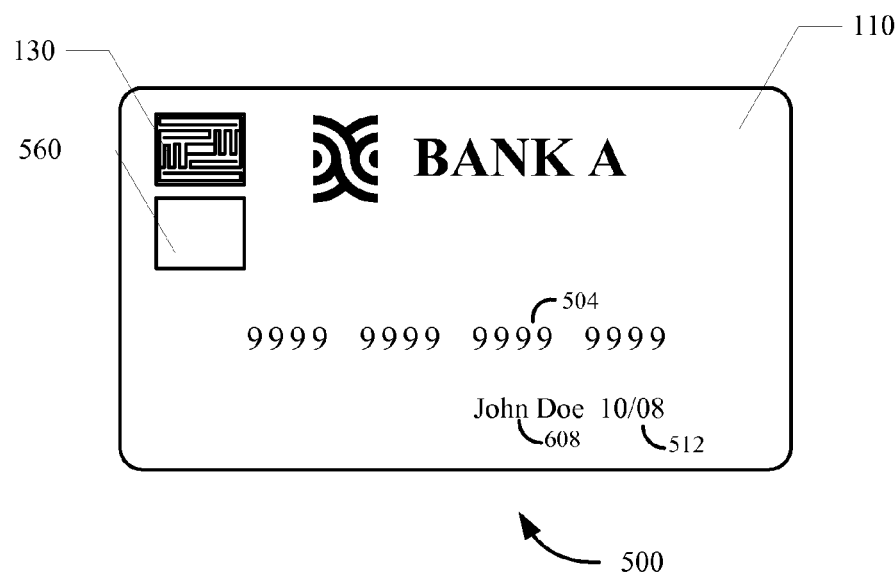
FIGS. 5A and 5B show a protected contactless card with an electroluminescence indicator according to one embodiment of the invention.

FIG. 5A shows a protected contactless presentation instrument 500 with an electroluminescence material 560 and an RFID chip 130. In this embodiment, when the RFID chip receives power through an inductor, the inductor powers the RFID chip as well as the electroluminescence material 560 causing the electroluminescence material 560 to illuminate. This electroluminescence material 560 alerts the user that the card has been activated and that card information may be transmitted from the RFID chip. In another embodiment, the electroluminescence material 560 may include a separate RF inductor that powers the electroluminescence material 560. Moreover, electroluminescence material maybe included on protected contactless cards employing the other embodiments of the invention. For example, electroluminescence material may be included on protected contactless presentation instruments employing tabs and shields as described above.

The electroluminescence material 560 may include any available electroluminescence material 560. For example, the electroluminescence material 560 may include a phosphor based material, Zinc-Sulfide doped with Copper, Zinc-Sulfide doped with Silver, Indium Phosphate, Gallium Arsenide, Gallium Nitride and/or any organic semiconductor. The electroluminescence material may include phosphor particles having a size between 10-25 microns dispersed within a polymeric binder, such as bisphenol-A epoxy. Other electroluminescence materials may be used.

Each of the protected contactless credit cards described in embodiments of the invention may be made of plastic and include embossed information on the front. As shown in FIG. 5A, a protected contactless credit card may also include an identification number 504, a name of the cardholder 508, and an expiration date 512. The identification number may in turn comprise a Bank Identification Number (BIN) and primary account number (PAN) used to identify the issuer and a respective account that in used in support of transactions initiated with the card 500. In typical embodiments, the first six through nine digits of the identification number 504 comprise the BIN, but in other embodiments different portions of the identification number 504 comprise the BIN. The PAN may similarly by comprised by a subset of the digits of the identification number 504. Other identification numbers may also be used, such as, identification numbers for loyalty cards or stored value cards.

Figure 5B:
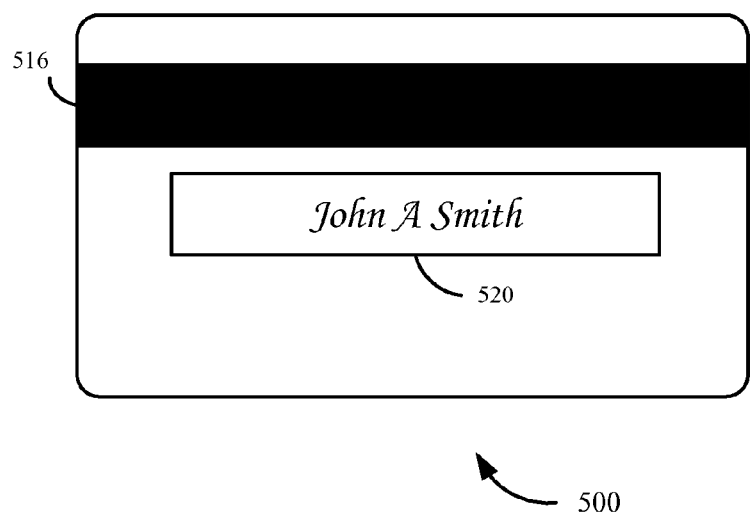

FIG. 5B shows an example of the back of protected contactless credit cards discussed in embodiments of the invention according to one embodiment of the invention. The back of these cards may include a magnetic stripe 516 and a signature space 520 to record the signature of the cardholders Data are stored on the magnetic stripe in accordance with standard protocols.

In another embodiment the present disclosure provides for a protected smartcard with a shield over the active chip of the smartcard. In such embodiments, such a shield may protect the chip from damage and/or wear and tear. A smartcard shield may be configured as in the embodiments shown throughout this disclosure. For instance, the shield may slide like the shield shown in FIGS. 2A and 2B. The shield may rotate as shown in FIGS. 4A and 4B. The smartcard chip may also be placed between a slideable shield that may slide when inserted into automated teller machine for example.

Figure 6:
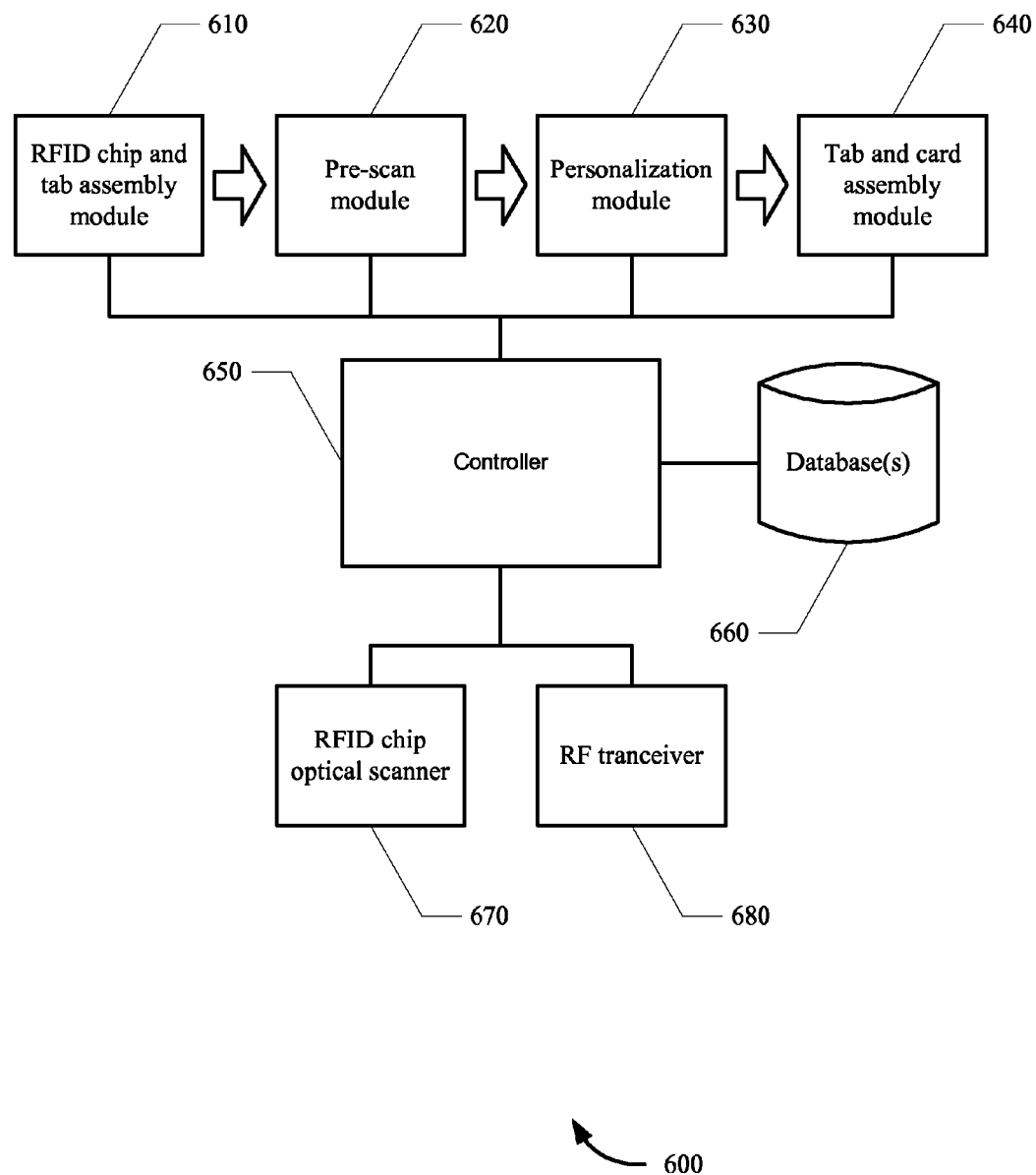
FIG. 6 shows a system for assembling protected contactless card according to one embodiment of the invention.

FIG. 6 shows a system for assembling protected contactless card according to one embodiment of the invention. In a typical automated application, the number of protected contactless cards to be assembled may be large, and, therefore, a batch process may be used. A general overview of a system that includes a number of different devices used in coordinating the assembly is illustrated in the figure. The system includes a controller 650 that implements methods of the invention and acts to control and coordinate the activities of other components comprised by the system. The controller 650 is in communication with one or more databases 660, within which information is stored or information is extracted as described below in coordinating assembly of the protected contactless card s. Other components of the system that may be provided in communication with and controlled by the controller 650 include an RFID chip optical scanner 670. This device is capable of reading and decoding the optical indicia provided on the RFID chips for identification. For instance, in embodiments where the optical indicia comprise bar codes, the RFID chip optical scanner 670 may comprise a standard bar-code reader. An RF transceiver 680 provided in communication with the controller 650 permits the transponder within each of the RFID chips to be activated, enabling information to be read from or written to the RF chip within each RFID chip.

The controller 650 may also be provided in communication with one or more logical modules that include instructions for implementing methods of the invention. An RFID chip and tab 140 assembly module 610 includes instructions for assembling an RFID chip with a tab 140. In alternative embodiments, the RFID chip is on the card itself. In such embodiments this module may include instructions for embedding the RFID chip with the card body. A pre-scan module 620 includes instructions that permit the system to be used in generating preliminary information that is stored within the database(s) 660 to facilitate later functions. A personalization module 630 includes instructions to enable personalization information to be encoded on an RFID chip. A tab 140 and card assembly module 640 may also be included. This module combines the card body and the tab 140. The module may also prepare a shield and if need attach the shield to the card body. The module may also require making cutouts within portions of the card body and may also include steps for assembling portions of the card body either before, after or while the tab 140 is being attached.

A quality-assurance module, while not shown, may also be included. A quality assurance module may include instructions that permit checks to be made of individual protected contactless cards to ensure that the recipient identified on the card corresponds to the correct personalization information encoded on the RFID chip within that card. It is generally expected that such quality-assurance processes will be performed on randomly selected samples, with statistical techniques being used to evaluate the reliability of the packaging.

In some embodiments, however, the quality-assurance module may be used routinely with every packaged RFID chip as an additional aspect of the process, thereby decreasing even further the risk of misidentification. In some embodiments, particularly after the reliability of the technique has been well established within a particular operational environment, the quality-assurance processes may be omitted.

Figure 7:
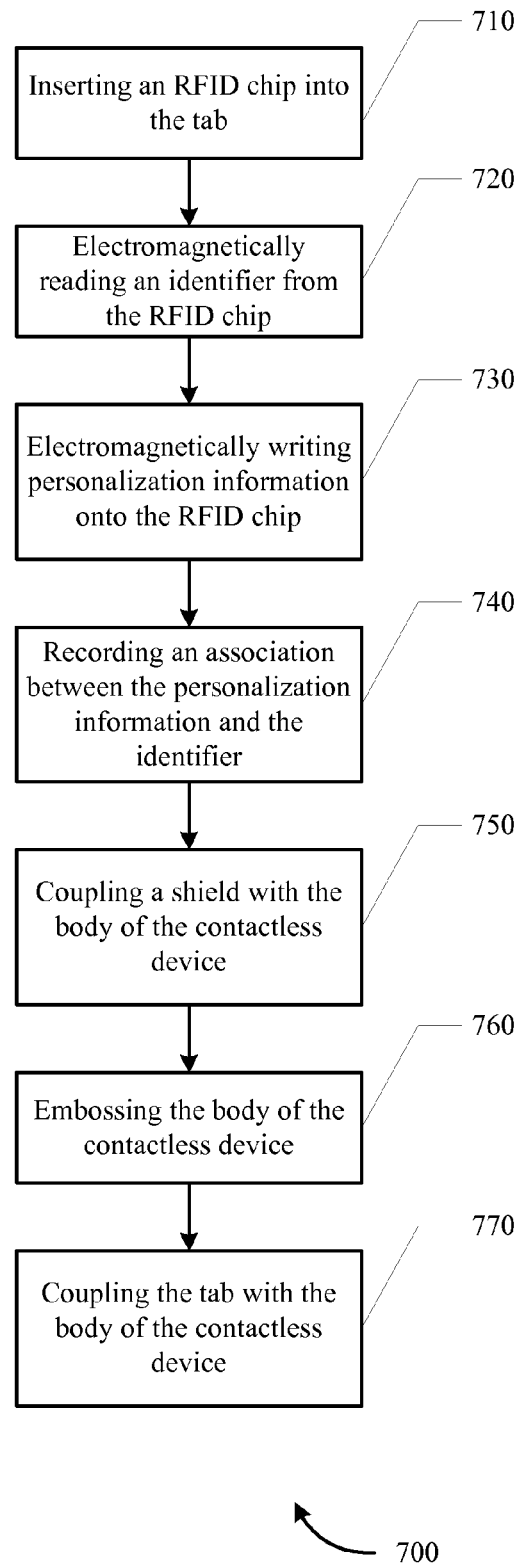
FIG. 7 shows a method for manufacturing a protected contactless device according to one embodiment of the invention.

FIG. 7 shows a method for manufacturing a protected contactless device according to one embodiment of the invention. Further personalization methodologies are included in U.S. patent application Ser. No. 10/911,979, which is incorporated herein by reference in its entirety for all purposes. The method begins by inserting a radio-frequency device with in a tab 140 at block 710. The RFID chip and tab 140 assembly module may provide the proper instructions for inserting the RFID chip within the tab 140. For example, the radio-frequency device may be inserted as part of a laminating process. As another example, the radio-frequency device may be adhered to a portion of a surface of the tab 140. Moreover, the radio-frequency device may be inserted within a cavity of the tab 140.

The identifier on the radio-frequency chip is electromagnetically read at block 720 using the pre-scan module 620. If an optical code is provided on the RFID chip, this code is scanned with an RFID chip optical scanner and saved. The identifier from the RFID chip may then be extracted by having an RF transceiver activate the chip and return its identifier. Typically, the identifier is provided as a numerical value, but may more generally be provided as any alphanumeric string or other identification sequence that uniquely identifies the chip. A correspondence between the RFID chip optical code and the chip identifier may be recorded in a database. This information thus always allows specification of either the chip identifier or the optical code to be used to identify the other for any of the pre-scanned optical devices.

Personalization information is then written onto the radio-frequency chip at block 730 with instructions provided by the personalization module 630. Personalization information may first be downloaded from a database. Such personalization information may generally be any information that is uniquely identified for each of a plurality of recipients of the RFID chips within a batch, but in a particular embodiment comprises magnetic-stripe information used in providing financial-account information for the recipients. Labels may also be printed that identify the recipients, and may include address information that allows the RFID chips to be mailed or otherwise delivered to the recipients.

An association between the personalization information and the radio frequency device identifier is recorded at block 740. The identifier for the RF chip within the RFID chip is read with an RF transceiver, a procedure that may be performed before or after the RFID chip is inserted within the tab 140. A correspondence between the RFID chip and the personalization information to be encoded on it is recorded in a database(s). When combined with the pre-scanning information, the database(s) thus includes a record of the personalization information, a record of the identifier of the chip within the RFID chip, and a record of the optical code on the RFID chip. The personalization information is injected with the RF transceiver. In some instances, the personalization information may be encrypted to provide security for the information, in which case relevant cryptographic keys may additionally be injected onto the chip with the RF transceiver. For example, the cryptographic keys may comprise data-encryption-standard ("DES") keys.

A batch of RFID chips may be personalized simultaneously for each RFID chip in the batch. By using pre-scanned devices, the database(s) may contain comprehensive information correlating the RFID chips with the chips they contain and the tab 140 and/or cards within which they are deposited. A check is made at block whether all of the labels within a given batch have been processed in this way.

The tab 140 may then be assembled with the body of the protected contactless card at block 770 by using module 640. Along with assembling the tab 140 and the card body, the shield may also be coupled to the body of the contactless device at block 750. The shield may be manufactured in a separate process that may include embedding a wire mesh into a thin plastic material, coating a thin plastic material with a metallic foil or painting a metallic ink on a thin material. Those skilled in the art will recognize other shielding techniques and processes for manufacturing the same. The body of the contactless device may then embossed at block 760 according to standard protocols. The tab 140 may then be coupled to the contactless device at block 770 in such a way that the portion of the tab 140 with the RFID chip is shielded by the shield in one position and exposed in a second position.

Figure 8:
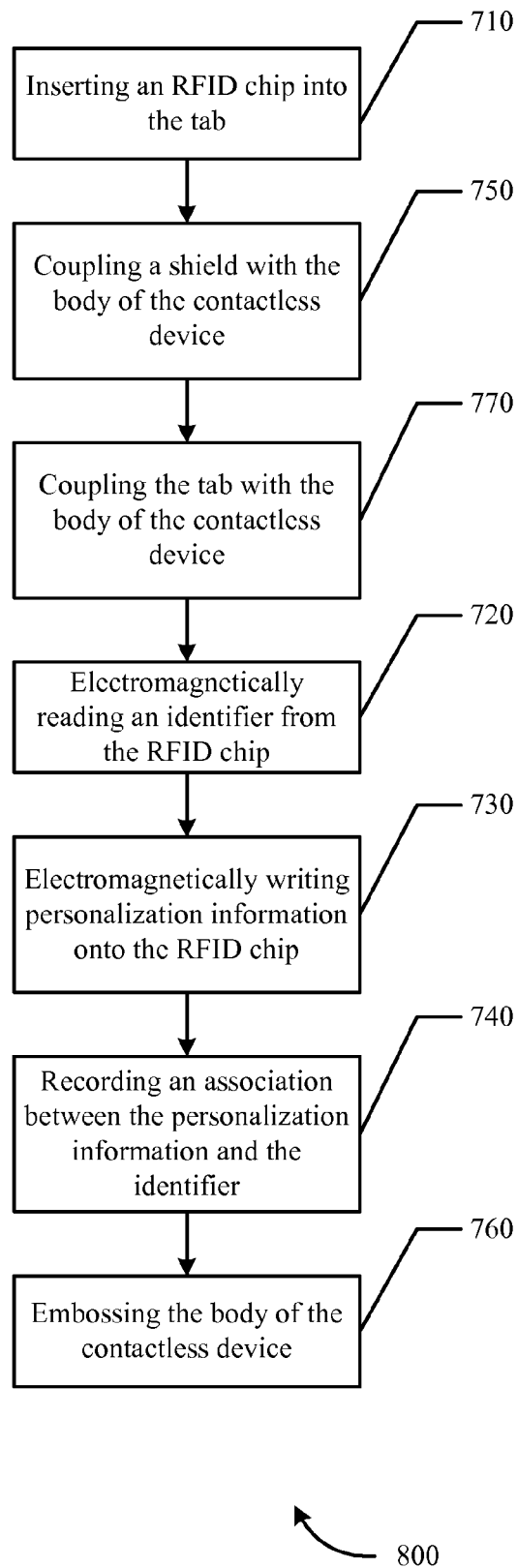
FIG. 8 shows a method for manufacturing a protected contactless device according to one embodiment of the invention.

FIG. 8 shows another method for manufacturing a protected contactless device according to one embodiment of the invention. In this embodiment the method of manufacture performs the same function as shown in FIG. 7, but in a different order. The method begins by inserting the RFID chip into the tab at block 710. The shield and the tab are then coupled with the contactless device at blocks 750, 770. An identifier is then electromagnetically read from the RFID chip at block 720. Personalization information is then written to the RFID chip at block 730. An association between the identifier and the personalization is made at block 740. The card may then be embossed at block 750.

The disclosure in regard to FIGS. 6, 7 and 8, is not limited to assembly of protected contactless cards with moveable tab 140s. Those skilled in the art will recognize simple mortifications that may be made to adapt the assembly process for protected contactless cards with moveable shields.

Moreover, while some of this disclosure has used credit cards to describe the embodiments of the invention, the invention is not limited thereto. Rather, the embodiments of the invention should be understood to extend to all contactless devices of any type, shape, and/or size, using any type of communication scheme. Other types of RFID devices may include passports, identification devices, stored value cards, access cards, key cards, and transportation cards.

The flow diagrams of FIG. 7 provide a particular sequence that may be followed in particular embodiments of the invention. It should be understood, however, that this particular sequence is merely exemplary and that other sequences may be used in alternative embodiments. Furthermore, the specific identification of steps that are performed is not intended to be limiting; in some embodiments some of the steps for the exemplary embodiments may be omitted while in other embodiments additional steps may be performed.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A contactless device comprising:
   a presentation instrument body;
   a shield, wherein the shield is coupled to the presentation instrument body;

a tab, wherein the tab is moveably coupled with the presentation instrument body, and wherein the tab slides between at least a first position and a second position; and a radio frequency identification (RFID) chip coupled to the tab and wherein:

the RFID chip is at least partially exposed when the tab is at the first position; and the RFID chip is at least partially covered by the shield when the tab is at the second position.

2. The contactless device according to claim 1, wherein the tab is rotatable between the first position and the second position.

3. The contactless device according to claim 1, wherein the tab further comprises grip edges.

4. The contactless device according to claim 1, wherein the presentation instrument body further comprises a magnetic stripe.

5. The contactless device according to claim 1, wherein the shield comprises a material selected from the group consisting of a metal mesh, a metal foil and a material coated with a metallic ink.

6. The contactless device according to claim 1, further comprising an electroluminescence material coupled with the presentation instrument body and electrically coupled with the RFID chip, wherein the electroluminescence material emits light when the RFID chip has been read by an RFID terminal reader.

7. The contactless device according to claim 1, further comprising a spring coupled to the tab and the presentation instrument body, wherein the springs biases the tab in the second position.

8. The contactless device according to claim 1, wherein the tab is circular in geometry.

9. A contactless device comprising:
a presentation instrument body;
an RFID chip coupled with the presentation instrument body;
a moveable shield coupled with the presentation instrument body, wherein the shield is moveable between at least a first position and a second position; and
an electroluminescence material coupled with the presentation instrument body and electrically coupled with the RFID chip, wherein the electroluminescence material emits light when the RFID chip has been read by an RFID terminal reader, and wherein:
the RFID chip is at least partially exposed when the moveable shield is at the first position; and
the RFID chip is at least partially covered by the moveable shield when the moveable shield is at the second position.

10. The contactless device according to claim 9, wherein the moveable shield slides between the first position and the second position.

11. The contactless device according to claim 9, wherein the moveable shield rotates between the first position and the second position.

12. The contactless device according to claim 9, wherein the moveable shield further comprises grip edges.

13. The contactless device according to claim 9, wherein the presentation instrument body further comprises a magnetic stripe.

14. The contactless device according to claim 9, wherein the moveable shield comprises a material selected from the group consisting of a metal mesh, a metal foil and a material coated with a metallic ink.

15. A contactless device comprising:
a presentation instrument body;
an RFID chip coupled with the presentation instrument body, wherein the RFID chip comprises a first RFID inductor; and
an electroluminescence material coupled with the presentation instrument body, wherein the electroluminescence material emits light when the RFID chip communicates with an RFID terminal reader.

16. The contactless device according to claim 15, wherein the electroluminescence material is excited by the RFID chip when the chip has been read by an RFID terminal reader.

17. The contactless device according to claim 15, wherein the electroluminescence material comprises a phosphor-based material.

18. The contactless device according to claim 15, wherein the presentation instrument body further comprises a magnetic stripe.

19. The contactless device according to claim 15, wherein the electroluminescence material is electrically coupled with the first RFID inductor.

20. The contactless device according to claim 15, further comprising a second RFID inductor coupled electrically coupled with the electroluminescence material.

21. A method of personalizing a protected contactless device that comprises an RFID chip coupled with a tab that is coupled with the body of a contactless device, the method comprising:
coupling the radio-frequency device into the tab;
recording account information on the radio-frequency chip;
coupling a shield with the body of the contactless device;
printing the body of the contactless device; and
coupling the tab with the body of the contactless device, wherein the tab is moveable between at least a first position and a second position, the first position is such that a portion of the tab including the radio-frequency chip is covered by the shield, and the second position is such that the portion of the tab including the radio-frequency chip is not covered by the shield.

22. The method of claim 21, wherein the personalizing the radio frequency chip comprises:
electromagnetically reading an identifier from the radio-frequency chip with a radio-frequency transceiver while the radio-frequency device is within the tab;
electromagnetically writing personalization information onto the radio-frequency chip while the radio-frequency device is within the tab; and
recording an association between the personalization information and the identifier on a storage device.

23. A contactless device comprising:
a presentation instrument body;
an RFID chip coupled with the presentation instrument body;
a shield coupled with the presentation instrument body, wherein at least one of the shield and the RFID chip is moveable relative each other to at least partially expose the chips and
an electroluminescence material coupled with the presentation instrument body and electrically coupled with the RFID chip, wherein the electroluminescence material emits light when the RFID chip has been read by an RFID terminal reader.

24. The contactless device of claim 23, wherein the shield is moveable relative to the RFID chip.

25. The contactless device of claim 23, wherein the RFID chip is moveable relative to the shield.

26. The contactless device of claim 23, further comprising an electroluminescence material coupled with the presentation instrument body, wherein the electroluminescence material emits light when the RFID chip has been read by an RFID terminal reader.

27. The contactless device of claim 23, further comprising a tab coupled with the RFID chip and is moveable relative to the shield.

28. The contactless device of claim 23, wherein the shield is moveable relative to the RFID chip.

* * * * *

UNITED STATES PATENT AND TRADEMARK OFFICE
CERTIFICATE OF CORRECTION

Page 1 of 1

PATENT NO.         : 7,950,585 B2
APPLICATION NO.    : 11/741255
DATED              : May 31, 2011
INVENTOR(S)        : Dan Skowronek et al.

It is certified that error appears in the above-identified patent and that said Letters Patent is hereby corrected as shown below:

On the Title Page, Item (75)

Please correct the spelling of the inventor's name. Please delete "Christopher T. Cocks" and insert --Christopher T. Cox--.

Signed and Sealed this
Eighth Day of November, 2011

David J. Kappos
*Director of the United States Patent and Trademark Office*